May 21, 1957
J. P. VEACH
2,792,774
TACO SHELL FRYER
Filed Feb. 15, 1954
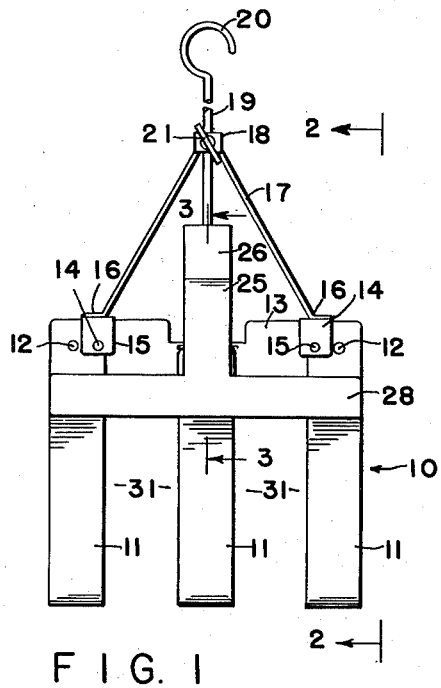
FIG. 1
FIG. 2
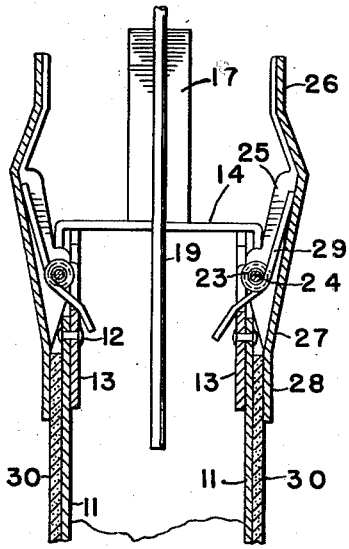
FIG. 3
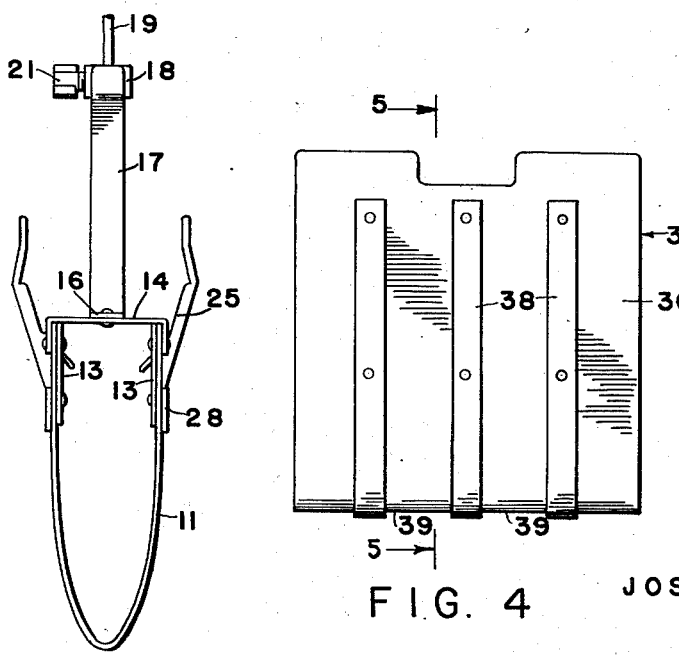
FIG. 4
FIG. 5
JOSEPH P. VEACH
INVENTOR.
BY
AGENT

United States Patent Office 2,792,774
Patented May 21, 1957

2,792,774

TACO SHELL FRYER

Joseph P. Veach, Santa Ana, Calif.

Application February 15, 1954, Serial No. 410,177

1 Claim. (Cl. 99—426)

This invention relates to a device for frying taco shells, these shells being made from the thin pan-cake-like corn products known as tortillas which when folded and fried to crispness and stuffed with various comestibles form a sort of sandwich known as a taco and popular in Mexico and in the southwest portion of the United States. The art of frying tortillas into taco shells as practiced by hand by the Mexican Indians throughout historic time involves holding a tortilla at opposite peripheral points by forks or sticks and dipping it in hot fat, a process obviously requiring the undivided attention of the person practicing it and subjecting the person to heat and possible burns. With the spread of popularity of the taco in this country, a number of devices have been developed for frying a plurality of taco shells simultaneously, for commercial production. However these devices are not suitable for the person who wishes to prepare one taco and who also wishes to give attention to other culinary activities. Even when their principles are applied to appliances for single taco shells, they generally require a pot of deep fat in which they may be immersed, and this in turn involves heating a large amount of oil or fat to perform a very small operation.

It is an object of this invention to provide a taco-shell fryer which can be conveniently used for frying one shell at a time. It will however be recognized that the fryer may easily be made in enlarged form so as to hold several taco-shells.

Another object of the invention is to provide a taco-shell fryer which may be used either in conjunction with a deep pot or with a shallow skillet, in the latter case effecting a great convenience and a saving in the amount of fat or oil used.

Broadly described my invention comprises a form upon which the tortilla is folded, spring clips for holding the tortilla upon the form and a lifting handle so arranged that the utensil may be hung in pots of various depths or placed on its side in skillets of various diameters. For this last purpose the handle is provided with an extensible and rotatable hook which may be used to engage the rim or handle of a pot or the rim of a skillet.

In the accompanying drawing,

Fig. 1 is a side-elevational view of a presently preferred embodiment of my invention;

Fig. 2 is an end view thereof, taken in the direction of the arrows 2—2 of Fig. 1;

Fig. 3 is an enlarged fragmentary sectional view on the vertical transverse line of section 3—3 of Fig. 1;

Fig. 4 illustrates in side elevation a modification of the mold or form upon which a tortilla is folded and held, the accompanying clips and handle being omitted; and Fig. 5 is a sectional view on the line of section 5—5 of Fig. 4.

Having reference now to the details of the drawing, I have shown in Figs. 1–3 a mold form 10 in which a plurality of strips 11 are bent in U-shape and have their margins remote from the bight of the U fastened, as by rivets 12, in spaced relationship one to another, to longitudinally extending top-plates 13. The top-plates 13 are held in spaced relationship by cross-bars 14, secured thereto in any suitable manner such as by rivets 15. To the cross-bars 14 are secured the feet 16 of a lifting bracket 17, the legs of which are joined to a block 18. The shank 19 of a hook 20 extends slidably through the block 18 and is secured therein adjustably by a thumb-screw 21.

The upper margins of the top-plates 13 are in part cut away to leave short ears which are rolled to form bearings 23 for hinge pins 24. Upon the hinge-pins 24 are mounted clamps 25 having operating fingers 26 extending upwardly above the mold 10. Downwardly extending fingers 27 terminate in clamp jaws 28, substantially coextensive with the mold 10. Coil springs 29, encompassing the hinge pins 24, engage the operating fingers 26 and the top-plates 13 so as to urge the jaws 28 against the strips 11. In Fig. 3 a tortilla 30 is shown thus clamped by its top edges and held firmly in position for frying.

When a tortilla is placed upon the mold 10 and clamped thereto by the jaws 28, no outer support for the tortilla is required other than the jaws 28, from which the tortilla can not escape. Double-molds, which are a nuisance to clean and to operate, are thus avoided. The utensils, with the tortilla thereon may be hung from a pot-handle or from a pot-rim by the hook 20, and the hook may be adjusted by the thumb-screw 21 to suspend the utensil in the hot-oil contents of a pot according to the depth of said contents below the support point. If it is desired to fry the taco shell in a shallow skillet, the hook 20 may be rotated 90 degrees from the position shown in Fig. 1 and then hooked over the edge of the skillet, the utensil being then substantially horizontal and resting upon one side. The skillet may contain only enough oil to immerse and fry one half of the taco-shell, after which operation the utensil may be lifted and reversed to fry the other half of the shell.

Whether the whole tortilla or only one-half thereof is being fried at one time, it is desirable to give access and circulation to the hot oil to both the inner and outer sides of the tortilla. For that reason I have employed the strips 11 in the preferred embodiment of my invention instead of a continuous mold sheet. The hot oil has access to the inner side of the tortilla in the passages 31 between the strips 11, and will seep between the tortilla and the strips. It will be understood that any form of reticulated inner mold may be considered the equivalent of the strips 11. To achieve the same purpose of access and circulation, a mold 35 as shown in Figs. 4 and 5 may be substituted for the mold 10. In this modification, a sheet 36 is bent to U-shape and takes the place of both the strips 11 and the top-plates 13, hinge-bearings 37 being formed from a cut-away portion of the upper margins of the sheet 36. To the outer side of the sheet 36 are suitably secured a plurality of ribs 38. The tortilla will then be clamped against the ribs 38, and oil may circulate in the passage 39 between the ribs to fry the inner side of the tortilla. It will be understood that clamps 25, brackets 17, and hooks 20 are mounted on the molds 35 as hitherto described. It will be obvious that either form of mold may be substantially flat in a skillet and that the absence of an outer mold permits the use of the utensil in shallower oil. It will also be obvious that a number of molds, each with individual clamps if desired, may be arranged in longitudinal extension, as by attaching a larger number of strips 11 to elongated top-plate 13, with one lifting bracket 17 and hook 20 supporting them all.

I claim:

A taco-shell fryer comprising: a U-shaped mold elongated to receive a tortilla upon its outer surface; a bracket for lifting said mold secured to the margins of said mold remote from the bight of said mold; spring clamps mounted upon said margins, having jaws spring-urged toward the outer sides of said mold so as to clamp a tortilla thereto, and having operating fingers extending above and beyond said margins for moving said jaws from said mold sides; a hook slidably and rotatably mounted in said bracket and extending outward from said margins; and means for securing said hook in selected positions of extension and rotation.

References Cited in the file of this patent

UNITED STATES PATENTS

| | | |
|---|---|---|
| 494,908 | Wade | Apr. 4, 1893 |
| 2,454,857 | Bish | Nov. 30, 1948 |
| 2,570,374 | Pompa | Oct. 9, 1951 |
| 2,627,222 | Luna | Feb. 3, 1953 |
| 2,635,528 | Torres | Apr. 21, 1953 |
| 2,664,812 | Molina | Jan. 5, 1954 |
| 2,719,480 | Prickett et al. | Oct. 4, 1955 |